United States Patent [19]

Goodman

[11] 4,300,484
[45] Nov. 17, 1981

[54] ELECTRONICALLY CONTROLLED FLUID INJECTION SYSTEM FOR AN INTERNAL COMBUSTION ENGINE

[75] Inventor: Toronta P. Goodman, Summit Point, W. Va.

[73] Assignee: The Goodman System Company, Inc., Armonk, N.Y.

[21] Appl. No.: 118,302

[22] Filed: Feb. 4, 1980

[51] Int. Cl.³ .................. F02B 47/00; F02B 47/02; F02B 47/08
[52] U.S. Cl. ..................... 123/25 J; 123/25 R; 123/25 L; 123/25 M; 123/25 K
[58] Field of Search .............. 123/25 J, 25 L, 25 M, 123/25 K, 25 R; 261/18 A, DIG. 61

[56] References Cited

U.S. PATENT DOCUMENTS

| | | | |
|---|---|---|---|
| 2,725,858 | 12/1955 | Tivoli | 123/25 J |
| 3,490,422 | 1/1970 | Bullis | 123/25 R |
| 3,500,802 | 3/1970 | Long | 123/25 J |
| 3,631,843 | 1/1972 | Yeiser | 123/25 M |
| 3,737,681 | 6/1973 | Rothermel | 307/246 |
| 3,857,543 | 12/1974 | McKeen | 251/129 |
| 4,051,815 | 10/1977 | Coberly | 123/25 A |
| 4,096,829 | 6/1978 | Spears | 123/25 J |

Primary Examiner—Charles J. Myhre
Assistant Examiner—E. Rollins Cross
Attorney, Agent, or Firm—Lane, Aitken, Kice & Kananen

[57] ABSTRACT

A fluid injection system for an internal combustion engine such as a spark-ignition or compression-ignition engine in which an injection nozzle injects a finely divided spray of fluid, such as water or a water solution, into the engine in response to a flow of atomizing air. The nozzle is connected to a fluid supply reservoir and to the outlet line of an air-injection pump connected to and controlled by an electronic circuit that includes a pick-up coupled to the ignition system of the engine. The electronic circuit responds to spark plug firing rate, which is proportional to engine speed, and to the amplitude of the voltage across the spark plug gap, which is proportional to engine load, and varies, respectively, the pump stroke rate and the pump stroke length accordingly. As a result, the flow of atomizing air to the nozzle and therefore the rate and magnitude of water injection is responsive to engine speed and load.

20 Claims, 7 Drawing Figures

ELECTRONICALLY CONTROLLED FLUID INJECTION SYSTEM FOR AN INTERNAL COMBUSTION ENGINE

BACKGROUND OF THE INVENTION

The present invention relates to a system for injecting a fluid, such as water or a water solution, into internal combustion engines and, more specifically, to a fluid injection system and method for injecting fluid into spark-ignition engines in which the injection rate is proportional to the engine speed and engine load.

Various cooling fluids, such as water and water in solution with other substances, such as methanol or alcohol, have been commonly injected into hydrocarbon engines, both of the spark-ignition and compression-ignition type, to provide improved engine operation. The fluid absorbs heat within the combustion chamber and provides for an even burning rate to prevent, or at least greatly minimize, detonation of the fuel charge in the combustion chamber. In addition, the fluid tends to diminish the accumulation of carbon deposits within the combustion chamber and, because the combustion process takes place at a generally lower temperature, inhibits the formation of high-temperature pollutants, specifically the oxides of nitrogen ($NO_x$).

Various types of prior devices have been used to introduce cooling fluids into the intake air of internal combustion engines. These devices have included nozzle-type injectors in which the fluid is pumped directly into the engine, and intake air humidifiers in which air is passed through a volume of water before being introduced into the engine. However, since the injection of a relatively low volume of fluid is desired when compared to the volume of fuel introduced into the engine, it is difficult, if not impossible, to meter the fluid with the precision needed to insure optimum performance when it is pumped directly into the engine. Also, if humidified air is used much less heat absorption is obtained when compared to water, since the humidified air is much less dense than water.

These prior devices suffer from additional problems, since they are usually operated solely in response to engine speed, directly by the exhaust gases from the engine, or either directly or indirectly in response to engine intake manifold pressure. Although these techniques result in a fluid injection rate that may be adequate under certain engine operating conditions, such as a constant-speed cruise condition, the injection rate during other engine operating conditions, such as acceleration and deceleration, may be too little or too much. When the fluid injection rate is insufficient, the beneficial effects of the cooling fluid are, of course, not obtained. Conversely, when the injection rate is too high, the surplus fluid within the combustion chamber tends to quench the combustion process and, of course, diminish engine performance.

SUMMARY OF THE INVENTION

It is therefore an object of the present invention to provide a system for injecting a fluid, such as water or a water solution, into the air intake side of an internal combustion engine in response to the flow of atomizing air through a nozzle to obtain a precise metering of the injected fluid.

It is another object of the present invention to provide a fluid injection system of the above type in which the fluid is injected in response to engine speed and engine load.

It is still another object of the present invention to provide a fluid injection system of the above type in which the injection occurs only at optimum times determined by the various operating modes of the engine.

It is still another object of the present invention to provide a fluid injection system of the above type in which the flow of the atomizing air through the nozzle is controlled by an electronic circuit that responds to spark plug firing rate and to the amplitude of the sparking voltage across the spark plug gap.

It is still another object of the present invention to provide a fluid injection system of the above type in which an air pump is provided for introducing the flow of atomizing air to the nozzle and is controlled by the above-mentioned electronic circuit.

It is still another object of the present invention to provide a fluid injection system of the above type which is inexpensive to manufacture and which is simple and reliable in operation.

It is a further object of the present invention to provide a fluid injection system of the above type which is simple to install on an internal combustion engine and which is ideally suited for after-market installations on previously manufactured vehicles.

Towards the fulfillment of these and other objects, the injection system of the present invention includes a fluid injecting device, such as a jet nozzle, which is located on the air intake side of an engine to introduce fluid in finely divided form into the intake air of the engine. The nozzle is connected to both a supply of cooling fluid and to a source of atomizing air that draws the fluid through the nozzle and into the engine. The atomizing air is supplied by an air-injection pump which includes an electro-magnetic actuator that is connected to, and driven by, an electronic circuit including a signal pick-up coupled to the engine ignition system. The arrangement is such that the pump is driven, and air therefore introduced to the nozzle, in response to both engine speed and engine load.

BRIEF DESCRIPTION OF THE DRAWINGS

The above brief description, as well as further objects, features and advantages, of the present invention will be more fully appreciated by reference to the following detailed description of presently preferred but nonetheless illustrative embodiments in accordance with the present invention, when taken in conjunction with the accompanying drawings wherein.

DESCRIPTION OF THE PREFERRED EMBODIMENT

Figure 1:
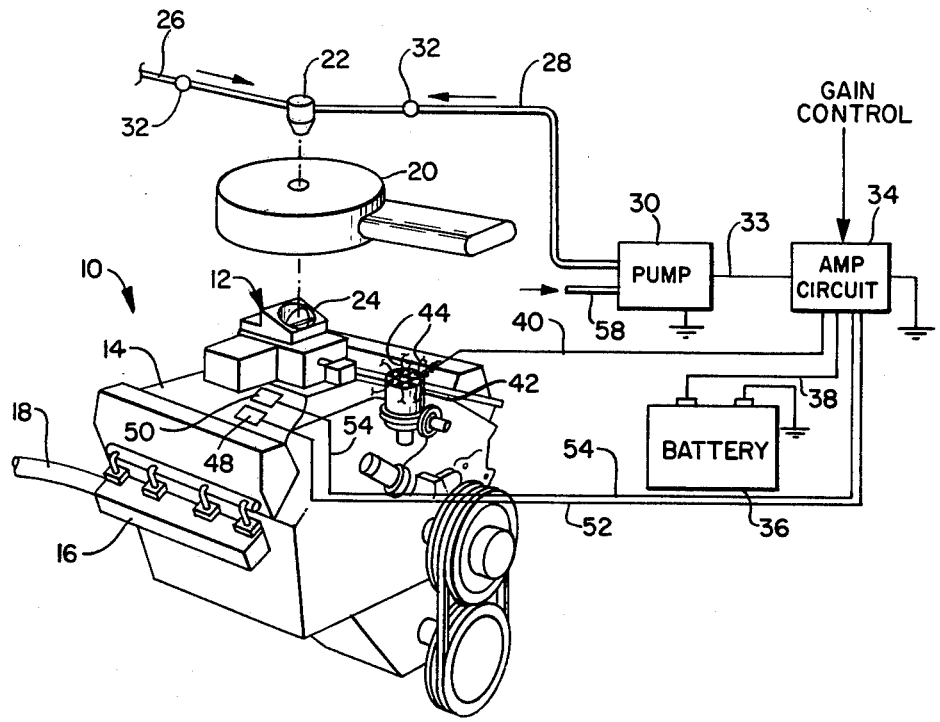
FIG. 1 is an exploded perspective view of an exemplary internal combustion engine equipped with the system of the present invention with certain components being shown schematically and with selected parts of the engine omitted for reasons of clarity.

An exemplary internal combustion engine incorporating the fluid injection system of the present invention is shown in FIG. 1 and is generally referred to by the reference numeral 10. The engine 10 is of conventional design and includes a carburetor 12 mounted on an intake manifold 14 for introducing a fuel/air charge into the combustion chambers of the engine. An exhaust manifold 16 is provided on each side of the engine for directing the exhaust gases produced during the combustion process through an exhaust system 18 (partially shown). An air cleaner, or other plenum, 20 is provided which normally is mounted over the carburetor 12 and which has a opening formed therein for receiving a fluid injection jet, or nozzle 22 which is adapted to inject cooling fluid, such as water or a water solution, into the intake air side of the engine 10. In the preferred embodiment, the nozzle 22 is mounted in the air cleaner 20 above an inlet opening 24 of the carburetor 12 to direct a downwardly diverging flow of finely divided fluid droplets into the intake air entering the opening 24.

The nozzle 22 is connected to the source of fluid through a hose 26 in a manner to be described in detail later, and is also connected, via a hose 28, to the outlet of a compressor, or air-injection pump 30. One-way valves 32 are provided in hoses 26 and 28 to prevent any reverse flow of fluid and air, respectively, from the nozzle. The air supplied through the hose 28 to the nozzle 22 from the outlet of the pump 30 serves to induce the flow of fluid through the hose 26 and to the nozzle 22 for discharge into the carburetor 12 in a manner described in more detail below.

The pump 30 includes an electro-magnetic actuator to be described in detail later, which is connected by an electrical conductor 33 to an amplifier circuit 34 powered by a vehicle battery 36 and connected thereto by a conductor 38, it being understood that the latter connection can be through the vehicle ignition switch so that the amplifier circuit is activated only when the ignition is turned on by the operator of the vehicle. The amplifier circuit 34 is connected, via a conductor 40, to a distributor 42 mounted on the engine 10. The distributor 42 includes a plurality of spark plug ignition wires 44 which are partially shown in the interest of clarity, and the conductor 40 is coupled to one of these wires in a manner to be described in detail later.

A pair of control units 48 and 50 are mounted on the engine block with the control unit 48 being connected to the amplifier circuit 34 by a conductor 52 and with the control unit 50 being connected to the amplifier circuit 34 via a conductor 54. It is understood that the control unit 48 includes a sensor valve (not shown) located in the intake manifold 16 for responding to intake manifold pressure, and the control unit 50 includes a temperature responsive probe or thermostat (not shown) for responding to engine temperature, both in a conventional manner. The control units 48 and 50 are thus electrically connected to the amplifier circuit 34, and function to selectively activate and deactivate the amplifier circuit and therefore the air pump 30 as will be described in detail later.

Figure 2:
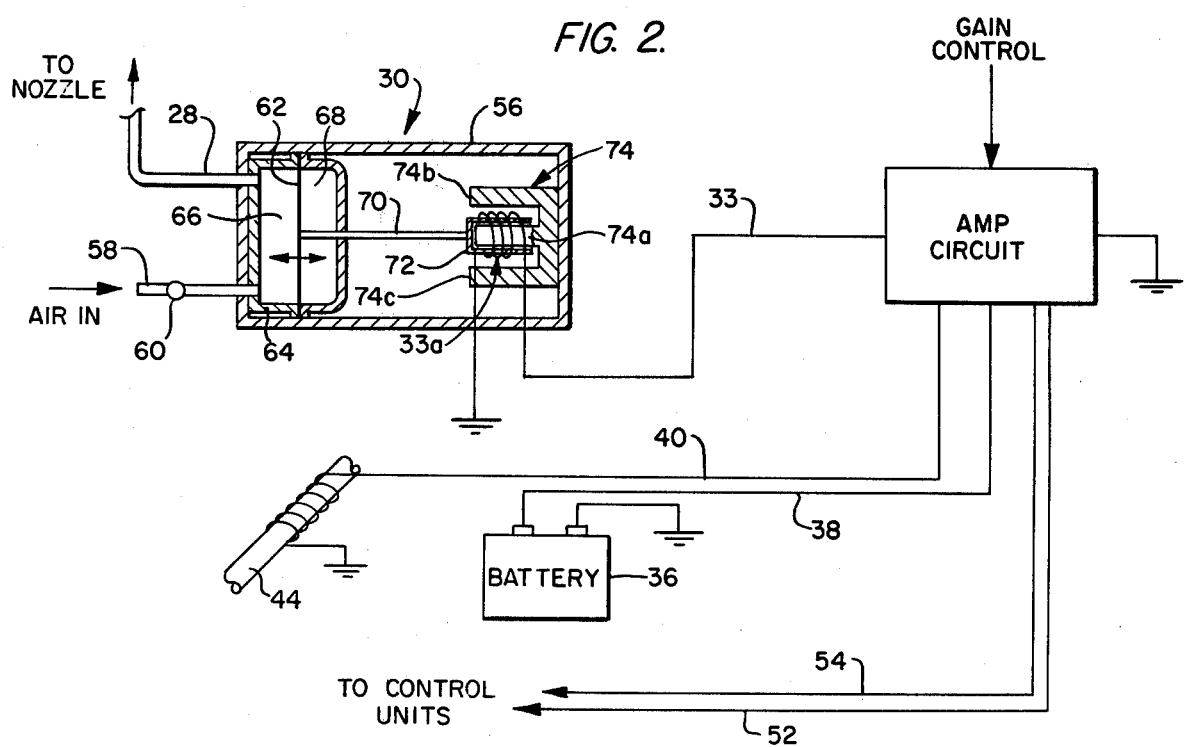
FIG. 2 is a view depicting the air pump of the system of FIG. 1 in cross-section and the amplifier circuit in block form.

The structural features of the air pump 30 are better shown in FIG. 2. Specifically, the pump 30 includes a housing 56 which receives the hose 28 and an additional hose 58. The hose 58 is open-ended, as shown, and may be located in a position adjacent the engine 10 in order to receive ambient air. A check valve 60 is provided in the hose 58 for admitting the flow of ambient air into the housing 56, but preventing the flow of air in the opposite direction. A diaphragm-like membrane 62 is provided within a subhousing 64 disposed within the housing 56 to divide the subhousing into two chambers 66 and 68. The hoses 28 and 58 extend through aligned openings in the housing 56 and the subhousing 64 in communication with the chamber 66.

An actuating rod 70 is mounted to a central portion of the membrane 62 and extends through an opening formed in the subhousing 64. The other end of the actuating rod 70 is connected to a U-shaped member 72 over which an end of the conductor 33 is wrapped to form a coil 33a. A permanent magnet 74 is provided in the housing 56 and includes a first pole member 74a extending within the member 72, and therefore the coil 33a, and additional pole members 74b and 74c, which are spaced from the pole member 74a and which extend over the member 72 and the coil 33a. As a result, the member 72 and the coil 33a move relative to the permanent magnet 74 in response to an electrical signal applied through the conductor 33 and the coil 33a. This movement of the member 72 is transmitted by the actuating rod 70 to the membrane 62 which draws a charge of air into the hose 58 and the chamber 64 upon an intake stroke and ejects the air from the chamber into the hose 28 upon a output stroke in the opposite direction. The coil 33a is adapted to respond to the electric signals provided by the amplifier circuit 34 to drive the actuator rod 70 at various stroke repetition rates in accordance with engine speed (RPM) and at various stroke lengths in accordance with engine load so that the pump 30 produces a flow of pressurized air that is uniquely responsive to these parameters.

Figure 3:
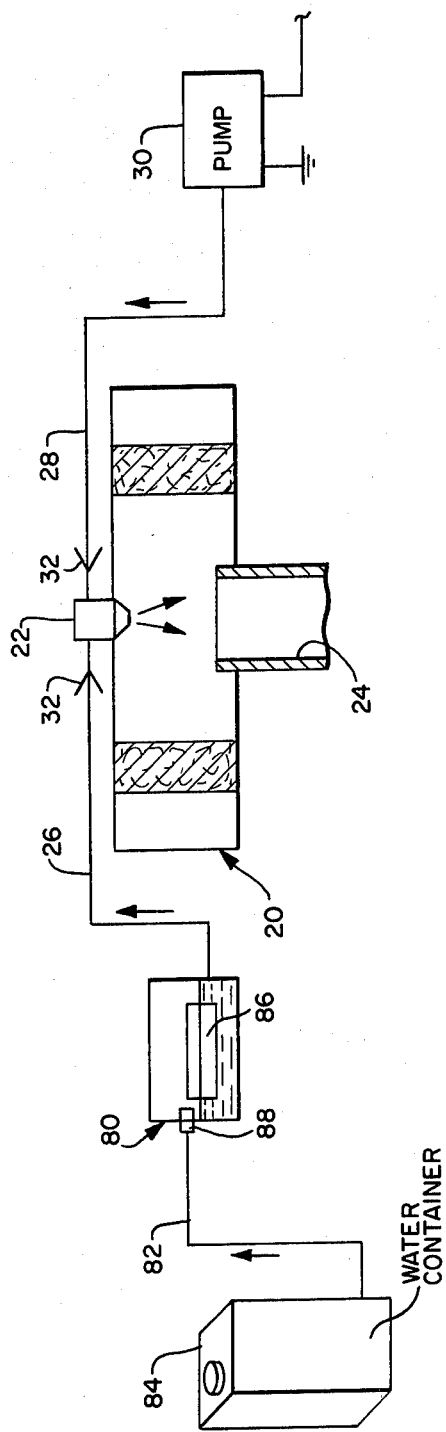
FIG. 3 is a schematic representation of a portion of the fluid injection system of FIG. 1.

As shown in FIG. 3, the supply hose 26 of the nozzle 22 is connected to a float-bowl reservoir 80 which, in turn, is connected through a supply line 82 to a fluid container 84. The float-bowl reservoir 80 includes a float 86 that operates an inlet valve 88, which can be of the needle valve type, to maintain a uniform level of cooling fluid within the reservoir 80 in a conventional manner. In the preferred embodiment, the fluid is in the form of water, or water in solution with other substances, such as methanol or alcohol, and the container 84 is provided with a pump (not shown) for pumping the fluid to the reservoir 80. Also, the float 86 is located at a selected elevation below the elevation of the nozzle 22 to prevent the fluid from unintentionally flowing under the influence of gravity to and through the nozzle 22. The reservoir 80, while not necessary to the operation of the system of the present invention, permits the supply container 84 to be located remotely from the engine 10 at a convenient elevation relative to the nozzle 22.

Figure 5:
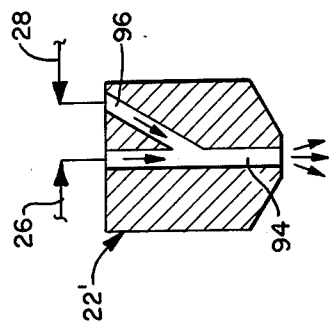
FIGS. 4 and 5 are cross-sectional views of two exemplary fluid injection nozzles suitable for use with the system of the present invention.
Figure 4:
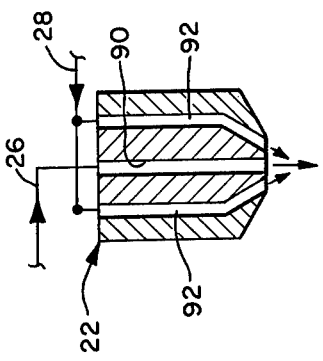

The nozzle 22 is adapted to provide a downwardly directed and preferably diverging flow of finely divided fluid droplets in response to the flow of air through the nozzle. While many different types of nozzles are suitable for use with the present invention, a preferred embodiment of the nozzle is shown in FIG. 4. This embodiment includes a central bore 90 for receiving the fluid from the hose 26 and a plurality of circumferentially arranged atomizing air supply channels 92 for receiving air from the hose 28 and for directing the flow of air to the outlet of the bore 90. The flow of air past the outlet of the bore 90 creates a low pressure zone which induces, or draws, fluid from the hose 26 through the bore 90 in a conventional manner, where it is mixed with, and atomized by, the air before passing into the inlet 24 of the carburetor 12. In the alternative, a nozzle 22' of the type shown in FIG. 5 may be provided which has a central bore 94 connected to the fluid supply hose 26 and an air-injection channel 96 connected to the air supply hose 28 that opens into the central bore 94 at an acute angle to effect the induction and atomizing function.

Figure 6:
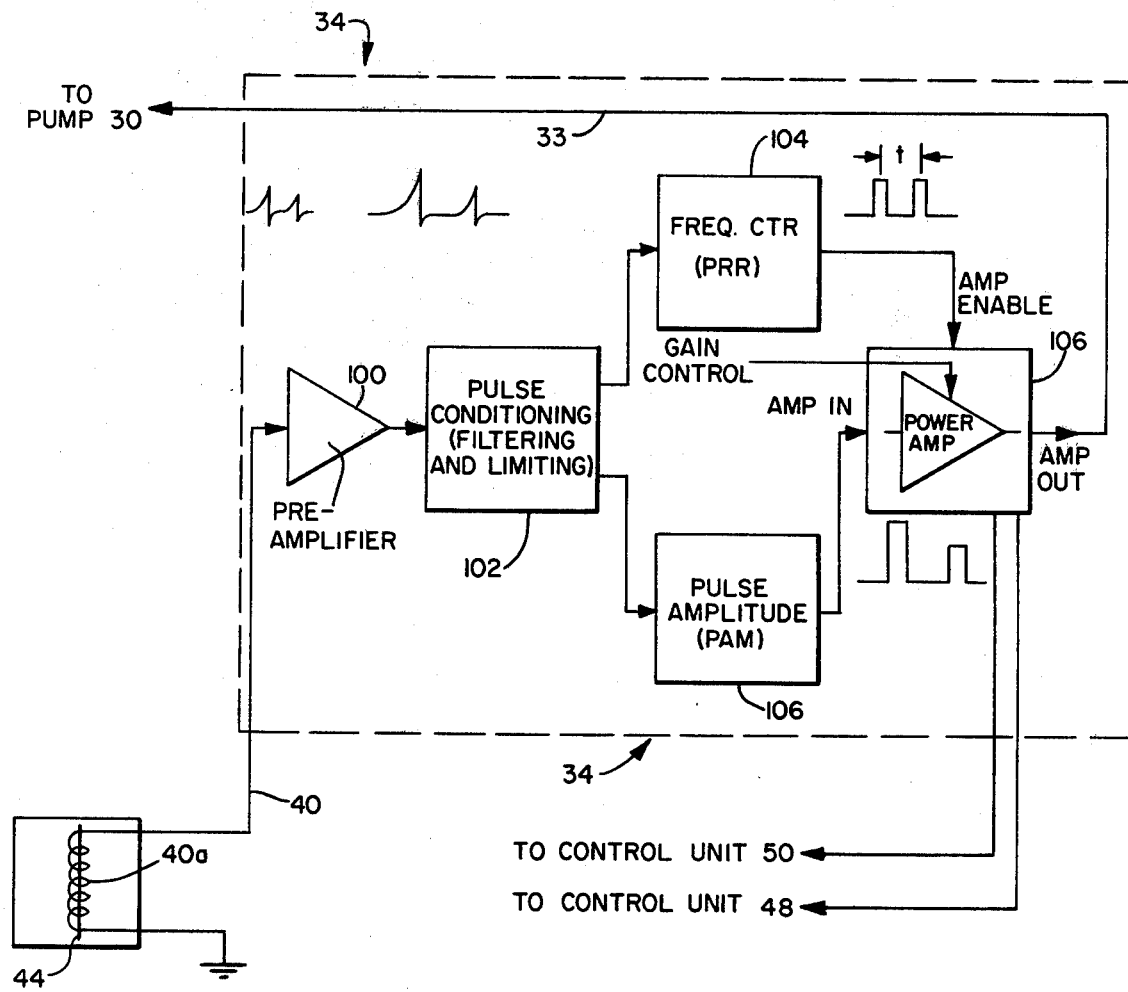
FIG. 6 is a block diagram of the amplifier circuit utilized in the system of the present invention with representative waveforms for the various stages, depicted in the diagram shown superposed on the diagram.
Figure 7:
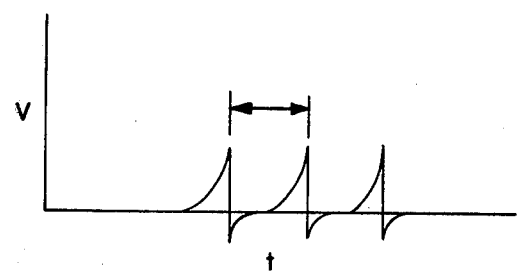
FIG. 7 is a graphical illustration depicting the variations in voltage across the engine spark plug gap as a function of time.

The amplifier circuit 34 is shown in block form in FIG. 6 with the battery 36 and its connections to the circuit being omitted in the interest of clarity. The amplifier circuit 34 includes the aforementioned conductor 40 whose end portion is coupled to one of the secondary ignition wires 44 of the distributor 42. In the preferred form, the conductor 40 includes a plurality of wire turns wrapped around the selected ignition wire 44 to form an inductive pick-up 40a which provides a signal that is representative of the electrical potential developed across the spark plug gap prior to and during firing. A series of representative signals is shown superposed on the circuit of FIG. 6 and FIG. 7 plotted on X-Y coordinates with each signal including an initial rising portion, a straight vertically extending intermediate discharge portion, and a terminal portion located below the X axis. The initial rising portion represents the build-up in potential across the spark plug gap prior to firing, the intermediate straight portion represents the breakdown or discharge during firing, and the terminal portion, represents the inductive ringing of the secondary circuit after discharge, as is known in the art. The maximum height of the rising portion prior to breakdown is responsive to engine load, since the amount of voltage required to produce a spark across the gap is dependent upon the fuel-air density and pressure in the cylinder prior to firing which density and pressure varies in accordance with the engine load.

Referring again to the circuit of FIG. 6, the pick-up 40a provides the ignition signal pulses to a preamplifier 100 which then provides amplified signals to a pulse conditioner 102 which includes filtering and limiting circuits. The pulse conditioner 102 provides a conditioned pulse to a frequency counter circuit 104 which provides uniformly shaped trigger pulses to the input of a power amplifier 106. The pulse repetition rate of the trigger pulses varies in accordance with the pulse repetition rate of the signals provided by the pick-up 40a and accordingly varies with engine speed. As can be appreciated, the amplifier 106 is thus enabled in response to and in proportion to the engine speed. The pulse conditioner 102 also provides conditioned pulses to a pulse amplitude modulator 106 which provides amplitude modulated pulses to the input of the amplifier 106. The amplitude modulated pulses vary in amplitude in response to the height of the signals provided by the pick-up 40a such that the amplitude modulated pulses vary in response to the spark plug gap breakdown voltage and, consequently, the engine load. As can be appreciated, the pulse output of the amplifier circuit 34 provided along conductor 33 to the pump 30 thus varies in response to both engine speed and engine load. The output pulses are applied to the coil 33a of the pump 30 to cause the actuator rod 70 to stroke in response to the amplitude of the applied pulses and the stroke repetition rate to vary in response to the frequency of the pulses provided. Accordingly, the air delivered by the pump varies in response to variations in engine speed and load as determined by the repetition rate of the ignition derived signal and the amplitude thereof, respectively. As shown in FIGS. 1, 2 and 6, the amplifier 106 is provided with a variable gain control so that the input/output gain of the amplifier can be adjusted to suit the operating requirements of a particular engine.

As indicated above, the control units 48 and 50 operate to deactivate the amplifier 106 and therefore the pump 30 under selected operating conditions of the engine 10. More particularly, the pump 30 is deactivated by the control unit 50 during cold starts, and continues in this mode during the warm-up until the engine temperature reaches a preselected value at which time the control unit 50 functions to place the pump in the activated state as described above. During normal acceleration and during cruise conditions, the pump 30 continues to operate in this activated state. However, during deceleration and during downhill coasting, the pump 30 is deactivated by the pressure sensor valve of the control unit 48 which responds to the corresponding negative pressure occurring in the intake manifold.

In operation, the amplifier circuit 34 receives pulse signals from the spark plug wire 44 with the pulse rate being responsive to engine speed and the amplitude of the pulse being responsive to engine load, as described above. The amplifier circuit 34 amplifies these signals and drives the air pump 30 accordingly to vary both the rate and magnitude of the strokes of the pump. As a result the rate and amount of air flow through the nozzle 22, and therefore the corresponding flow of fluid from the hose 26, through the nozzle and into the inlet opening 24 of the carburetor 12 vary in response to engine speed and engine load, respectively. Since the air passing through the nozzle 22 is at a much higher pressure and flow rate when compared to the water, a relatively high volume of air is thus used to control a much smaller volume of water, which enables a very precise metering of the water to be obtained.

Of course, during times that the amplifier 106, and therefore the air pump 30 is deactivated by the control units 48 and 50, (that is, during start-up, part of the warm-up sequence and deceleration), the flow rate of the atomizing air through the nozzle 22, and the resulting injection of fluid into the carburetor 12, is terminated.

As a result of the foregoing, the fluid injection system of the present invention operates only at times which are optimum as determined by the critical operating modes of the engine. This plus the precise metering of the water that is achieved by the system of the present invention results in a dramatic increase in engine efficiency.

While the preferred embodiment of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder and V-8 engines. Also, the present invention is not limited to use with engines having a carburetor for mixing air and fuel but can easily be adapted to fuel injection and stratified charge engines by directing the cooling fluid into the cylinder of the engine through an appropriate inlet.

Also, although reference has been made to the terms "cooling fluid", "water", and "water in solution" it is understood that other types of fluids can be injected that affect the combustion process, such as octane improvers, anti-detonates and oxygen additives, etc.

Still other variations in the foregoing can be made within the scope of the invention. For example, although reference is made to the use of hoses to connect the various components in fluid flow communication, it is understood that other conduits such as tubing, pipes, etc. can be used. Also, a demand regulator, or the like, can be provided in place of the float-bowl reservoir 50 to provide the fluid to the hose 26. Further, the position and location of the nozzle 22 can be varied as long as it is effective to introduce the fluid into the intake air side of the engine 10, and more than one nozzle can be provided as dictated by the specific type of engine. Also, the amplifier circuit 34 can be connected, via the conductor 40, and the pick-up 40a to the high tension coil wire of the distributor 42 rather than to a spark plug ignition wire as described above. Further, other types of secondary ignition pick-ups, including capacitive pick-ups and direct connections through high impedances are suitable. Still further, variations in the electronic circuit disclosed above can be made as long as the circuit responds to the input signals and produces the same type of output signals as disclosed above. Still further, other types of air pumps, other than the particular vane pump described above, can be used in the system of the present invention.

As also will be apparent from those skilled in the art, still other changes and modifications may be made to the water injection system of the present invention without departing from the spirit and scope of the invention as recited in the appended claims and their legal equivalent.

What is claimed is:

1. A system for injecting fluid into a cylinder of an internal combustion engine having an ignition system, said fluid injecting system comprising first means for introducing air to a supply of said fluid for injecting said fluid into said cylinder at a rate proportional to the flow of said air, and second means in a responsive relation to said ignition system for responding to engine speed and engine load related signals from said ignition system for introducing air to said first means at a flow that varies in response to engine speed and engine load.

2. The system of claim 1 wherein said second means comprises means for receiving air and for pressurizing said air.

3. The system of claim 2 wherein said means for receiving and pressurizing said air comprises an air-injection pump having a variable stroke rate and a variable stroke length.

4. The system of claim 3 wherein said second means further comprises means in a driving engagement with said pump for varying said stroke rate and said stroke length in response to said signals.

5. The system of claim 4 wherein said variations in said stroke rate and stroke length result in proportional changes in the flow of said air.

6. The system of claim 5 wherein said variations in said stroke rate and stroke length varies the rate of flow of said air and the amount of flow of said air, respectively.

7. The system of claim 1 wherein said first means comprises a nozzle connected to a source of fluid and means connecting said nozzle to said second means, said nozzle including fluid and air flow passages formed and arranged in a manner to draw said fluid from said supply of fluid and through said fluid flow passage in response to the flow of air through said air flow passage.

8. The system of claim 7 wherein said fluid and air flow passages are further formed and arranged to mix said fluid and air upon their discharge from said nozzle.

9. The system of claim 1 wherein said engine includes a carburetor which receives said fluid before it is injected into said cylinder.

10. The system of claim 1 wherein said second means includes an air injection pump having an electro-magnetic actuator which responds to electronic signals for varying the stroke rate and stroke length of said pump.

11. The system of claim 10 wherein said second means further include an amplifier circuit electrically connected to said ignition system and to said actuator.

12. The system of claim 11 wherein said amplifier circuit comprises electrical conductor means coupled to said ignition system for receiving said signals, an electronic amplifier for amplifying said signals and means electrically connecting said amplifier to said actuator.

13. The system of claim 12 wherein said electrical conductor means is inductively coupled to a spark plug wire of said ignition system so that the pulse rate of said signal is in proportion to engine speed and the amplitude of said signal is in response to engine load.

14. The system of claim 13 wherein said amplifier drives said actuator so that said stroke rate and said stroke length of said pump vary in response to changes in said pulse rate and amplitude of said signals.

15. The system of claim 14 further comprising means for varying the gain of said amplifier and therefore the stroke rate and stroke length of said pump.

16. The system of claim 14 wherein said pump includes a membrane coupled to said actuator so that said variations in said stroke rate and stroke length results in proportional changes to the flow of said air.

17. The system of claim 11 further comprising an electronic temperature sensing circuit responsive to the temperature of said engine and electrically connected to said amplifier circuit for deactivating said latter circuit and therefore said actuator in response to the temperature of said engine being below a predetermined value.

18. The system of claim 11 or 17 wherein said engine has an intake manifold and further comprising an electronic fluid pressure circuit responsive to the fluid pressure in said intake manifold and electrically connected to said amplifier circuit for deactivating said latter circuit and therefore said actuator in response to the pressure in said intake manifold attaining a predetermined value.

19. The system of claim 1 further comprising means for deactivating said second means in response to the temperature of said engine being below a predetermined value.

20. The system of claim 1 or 19 wherein said engine has an intake manifold and further comprising means responsive to fluid pressure in said intake manifold for deactivating said second means in response to the pressure in said intake manifold attaining a predetermined value.

* * * * *